Jan. 19, 1960
G. A. LYON
2,921,548
MEANS FOR MAKING WHEEL COVERS
Filed April 29, 1955
3 Sheets-Sheet 1
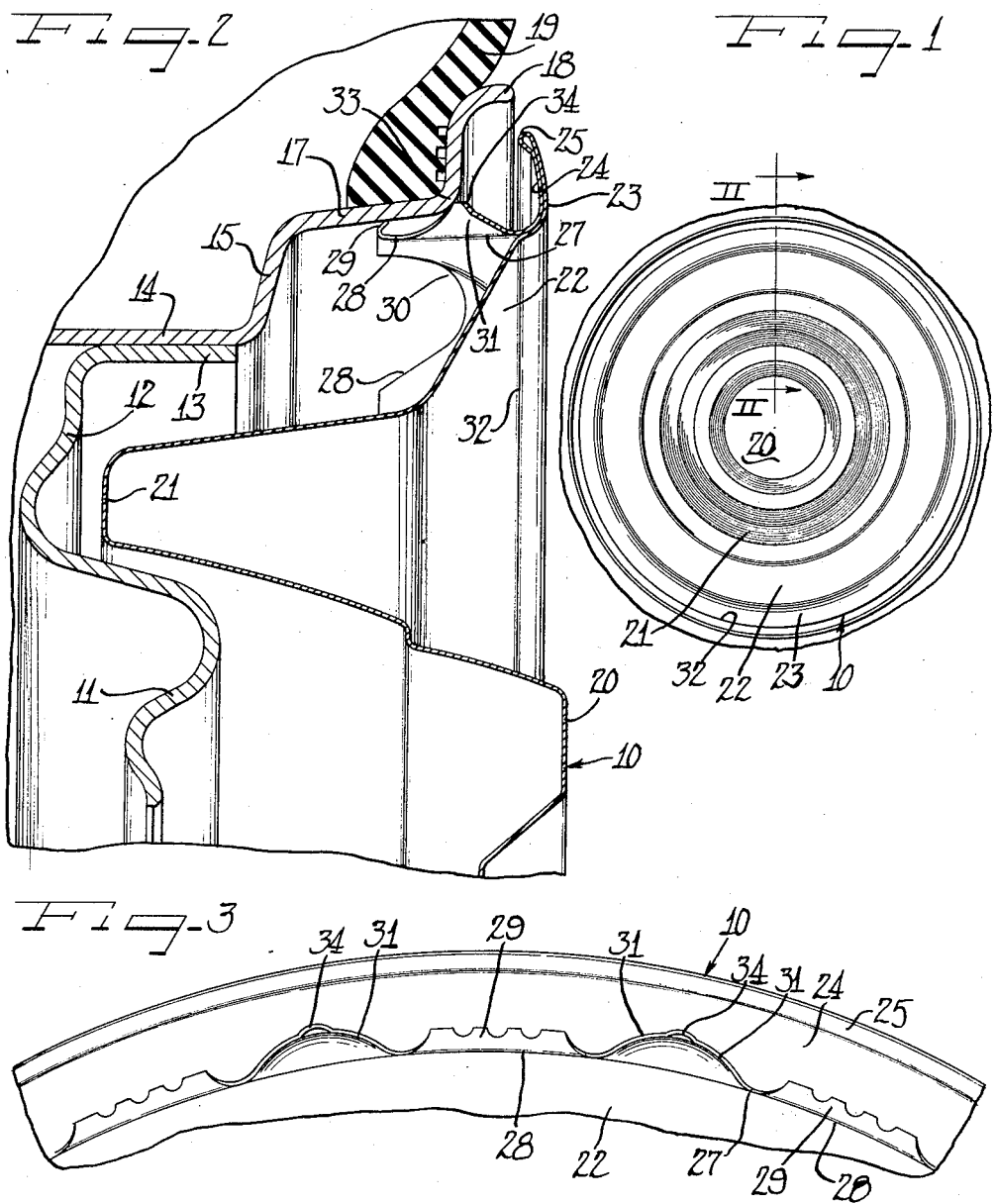
Inventor
George Albert Lyon
Attys

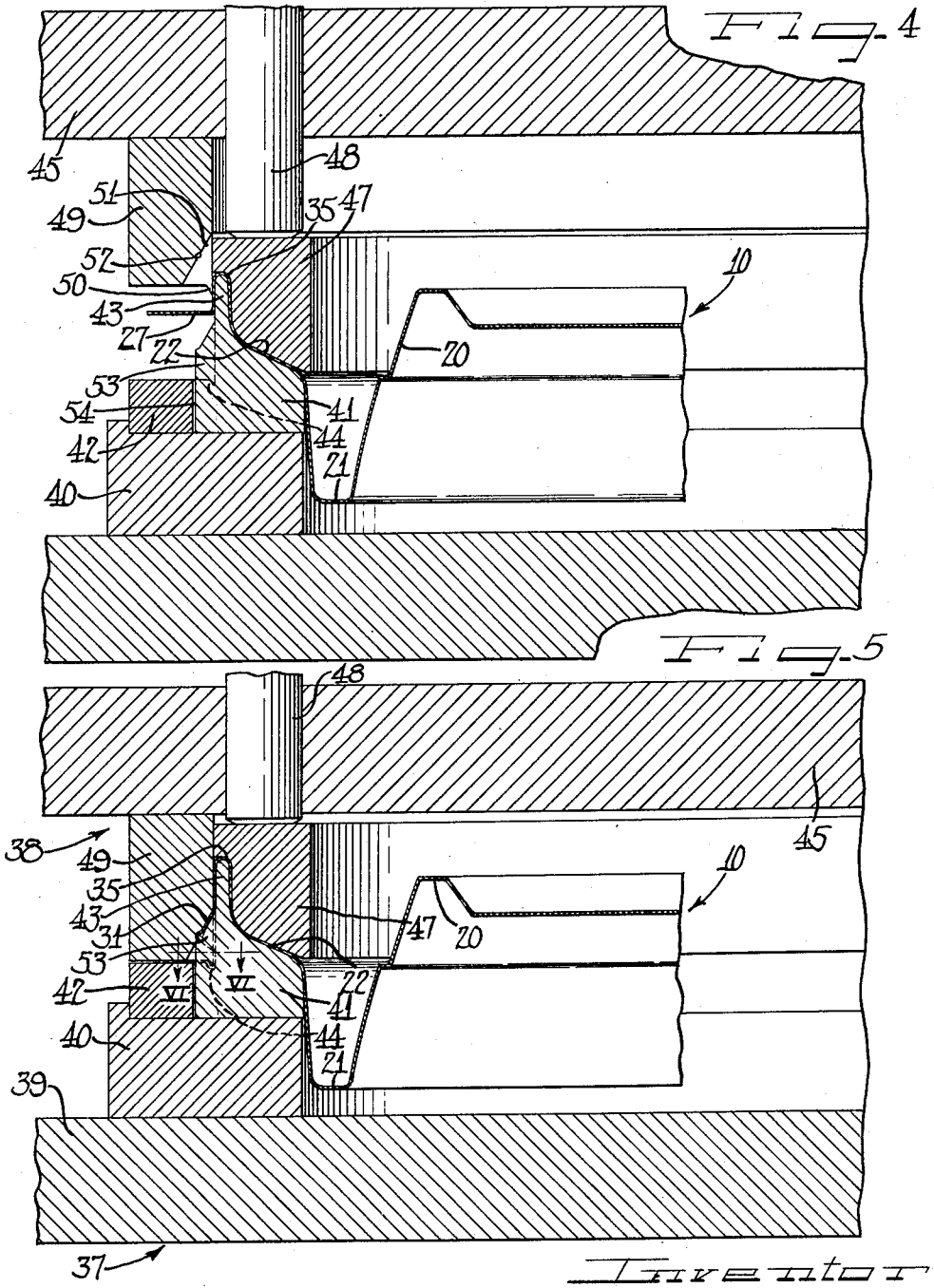

Jan. 19, 1960 G. A. LYON 2,921,548
MEANS FOR MAKING WHEEL COVERS
Filed April 29, 1955
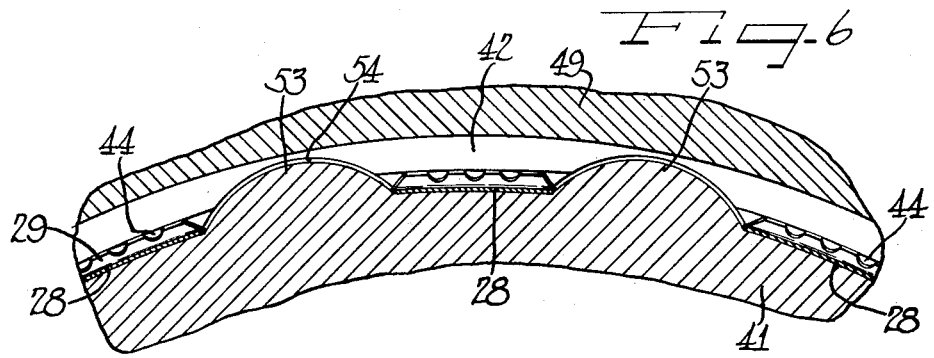
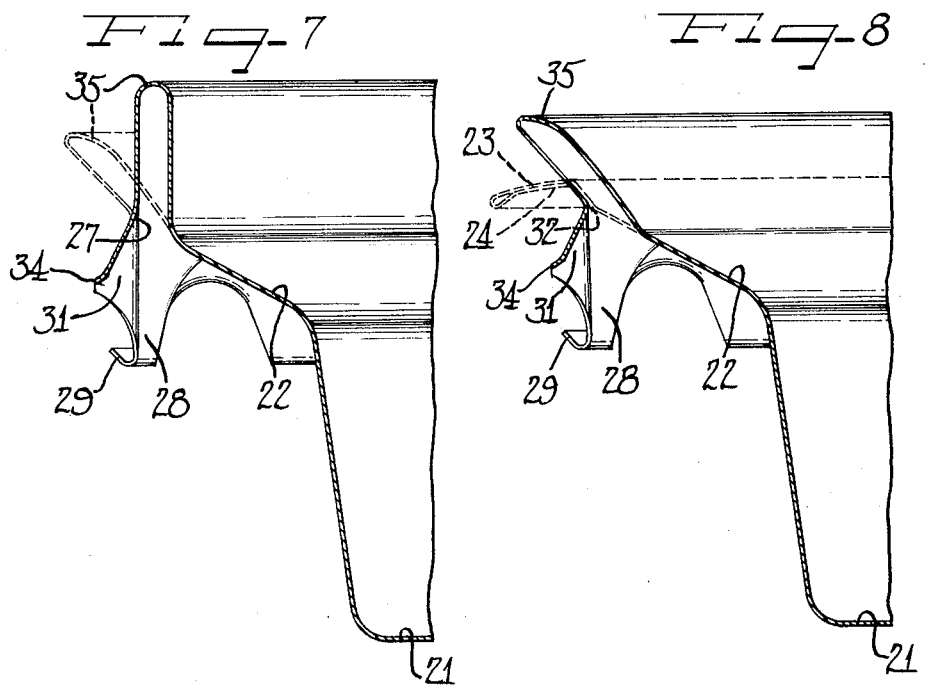
Inventor
George Albert Lyon

United States Patent Office 2,921,548
Patented Jan. 19, 1960

2,921,548

MEANS FOR MAKING WHEEL COVERS

George Albert Lyon, Detroit, Mich.

Application April 29, 1955, Serial No. 504,978

1 Claim. (Cl. 113—49)

The present invention relates to the manufacture of wheel trim or covers such as are adapted to be applied to the outer sides of vehicle wheels for ornamental and protective purposes.

The present application is a continuation-in-part of my application Serial No. 371,839, filed August 3, 1953, now Patent No. 2,707,449, dated May 3, 1955.

In my said copending patent is disclosed and claimed a method of making wheel trim or covers from sheet metal stock provided with marginal self-retaining fingers on a cold worked, resilient axially inwardly directed flange behind the margin of the cover, and with a rib or fold turned laterally and radially outwardly through and beyond the circle of the flange to increase the overall diameter of the cover and conceal the retaining means therebehind.

Where the retaining flange and the finger extensions must be of a length to maintain the outer marginal portion of the cover substantially spaced from the tire rim to which the cover is attached by means of the fingers, the retaining flange and fingers may be of such depth and length as to be unduly flexible and thus fail to retain the cover adequately at least under severe jarring or extraneous pressures against the cover in service, this in spite of the substantial cold working and thereby hardening and resiliency imparted to the flange and fingers incident to practice of the method in my aforesaid application.

I now find that this deficiency insofar as extra deep flange and long fingers is concerned can be remedied by additionally working and stiffening portions of the retaining flange intermediate the retaining fingers, and it is to this improvement that the present application is directed.

It is accordingly an important object of the present invention to provide an improved method of making wheel trim wherein additional resiliency is worked into a retaining flange adjacent to retaining finger extensions therefrom in order to reduce the inherent flexibility of the fingers and flange, to thereby increase the resilient tensioned retaining engagement characteristics of the fingers with a wheel part.

Another object of the invention is to improve the method of making wheel trim by substantially increasing the work hardened resiliency characteristics of the marginal portions of the trim including retaining flange and finger means thereon.

Another object of the invention is to provide an improved method of providing wheel trim with combination retaining finger, reenforcing and stop means for cooperation in retaining the trim in a predetermined mounted relation upon a vehicle wheel.

Still another object of the invention is to provide improved die structure for not only working a cover retaining flange of a wheel trim to impart overall resiliency thereto but also to rework and impart additional stiffness and resiliency to portions of the flange between retaining fingers thereof for reenforcing and stiffening retaining fingers.

Other objects, features and advantages of the present invention will be readily apparent from the following detailed description of a preferred embodiment thereof taken in conjunction with the accompanying drawings in which:

Figure 1 is an outer side elevational view of a vehicle wheel structure embodying a cover or trim made according to the present invention;

Figure 2 is an enlarged fragmentary radial sectional view taken substantially on the line II—II of Figure 1;

Figure 3 is a fragmentary rear elevational view of a marginal portion of the cover of Figure 2;

Figure 4 is a fragmentary vertical sectional view through drawing die apparatus for practicing features of the method of the present application;

Figure 5 is a vertical sectional view similar to Figure 4 but showing the drawing die apparatus at the conclusion of the drawing stroke thereof;

Figure 6 is an enlarged fragmentary horizontal sectional view taken substantially on the line VI—VI of Figure 5;

Figure 7 is a fragmentary radial sectional view through the cover blank following conclusion of the marginal shaping thereof in the apparatus of Figures 4 and 5; and Figure 8 is a sectional view similar to Figure 7 but showing the cover blank after the marginal structure has been further worked toward completion of the cover.

In order best to understand the advantages of the present invention, reference is made first to Figures 1, 2 and 3 showing a completed cover 10 made according to the present invention and adapted for disposition at the outer side of a vehicle wheel including a wheel body 11 provided with an annular outer marginal deeply dished portion 12 from which projects at the radially outer side thereof but generally axially outwardly directed attachment flange 13 secured in suitable manner to a base flange 14 of a tire rim. Projecting generally radially outwardly from the outer side of the base flange is a side flange 15 merging with an intermediate generally axially outwardly and radially sloping flange 17 from the outer side of which extends generally radially outwardly and axially outwardly turned a terminal flange 18. The tire rim supports a pneumatic tire 19 which may be of the tubeless type as shown or a tire and tube assembly.

The wheel cover 10 takes advantage of the substantial depth of the wheel inside of the tire rim to afford a deep draw, massive appearance, which is accentuated by the provision of a high central crown portion 20, a deeply indented annular intermediate portion 21 adapted to extend well down within the groove defined by the inwardly dished annular wheel body portion 12, and an annular radially outer portion 22 that projects substantially axially outwardly into axially outwardly overlying relation to the tire rim.

A reenforced stiffly resilient marginal structure and improved retaining means therebehind are provided on the cover 10. To this end, the outer marginal extremity on the cover comprises an annular reenforcing rib marginal extremity 23 on the outer cover portion 22 having nested therebehind an underturned flange portion 24 joined thereto on a reenforcing and finishing bead-like extremity juncture 25. For retaining the cover on the wheel, the underturned flange 24 has a generally axially extending flange portion 27 from which projects an annular series of circumferentially spaced retaining finger extensions 28 provided at their inner terminals with short and stiff generally radially and axially outwardly oblique rim engaging legs or terminals 29 the edges of which are grippingly engageable with the inner face of the intermediate flange 17 for retaining the cover on the wheel.

Since to enable the desired substantial axially outward spacing of the outer marginal flange structure 23, 24 relative to the terminal flange 18 of the tire rim, it is desirable to have the flange 27 and the retaining fingers 28 of substantial depth or length, it will be appreciated that substantial flexibility will be experienced for radial deflection of the fingers and contiguous portions of the flange 27. Therefore to reenforce and enhance the resiliency of the flange and fingers there are provided in line with arcuate cut-outs 30 between the retaining fingers 28, generally axially extending and radially outwardly projecting reenforcing corrugations 31 which flare toward the inner edge extremity of the flange 27 and attain maximum radially outward projection at their inner extremities. At their sides the flaringly transversely arcuate corrugations 31 merge with the sides of contiguous retaining fingers 28. At their axially outer ends the reenforcing corrugations 31 merge into the juncture of the flange portion 27 with the flange 24 adjacent to a backup annular reenforcing rib 32 at the radially inner side of the rib marginal portion 23 and cooperating with the axially outer side of the flange 27 for stiffening the flange in cooperation with the corrugations 31.

In addition to serving as resiliency enhancing reenforcement, the corrugations 31 provide cover supporting stops for maintaining the cover in axially inward disposition and centered on the wheel by engagement with a shoulder 33 at the juncture of the intermediate flange 17 with the terminal flange 18. This is enabled by having the corrugations 31 project substantially radially outwardly at their inner terminals beyond the diameter described about the tips of the retaining finger terminal flanges 29. Therefore, when the cover is pressed axially inwardly onto the wheel to cam the retaining terminals 29 onto the intermediate flange inner face of the tire rim, the corrugation terminals will bear against the shoulder 33 and limit the axially inwardly disposition of the cover relative to the wheel and support the cover in spaced relation not only to the tire rim but also the wheel body 11.

To facilitate removal of the cover from the wheel, and to further stiffen the corrugations 31, the tip extremities of the corrugations are turned outwardly as at 34. Thereby when the stop-corrugations 31 are in engagement with the shoulder 33, a slight gap will remain between the turned central tip portions 34 and the tire rim for engagement thereunder of a pry-off tool by which the cover is adapted to be removed from the wheel.

In making the cover 10, a blank of suitable sheet material such as stainless steel, brass or like cold workable material may be subjected to substantially the cold work drawing method set forth in my copending Patent No. 2,707,449 which includes drawing a sheet metal blank to provide the crown portion 20, the indented or dished annular intermediate portion 21 and the outer annular portion 22, but with the outer marginal portion of the outer annular cover portion 22 arranged to be subjected to a plurality of further working steps. In this preliminarily drawn form of the blank, as shown in Fig. 4, the margin of the cover is provided with an axially outwardly directed annular, generally U-shaped, axially inwardly opening axially elongated rib 35 with a radially inner leg merging into the adjacent surface of the cover portion 22 and with an outer axial leg merging into the cover retaining flange 27 which initially is part of the margin of the blank and lies horizontally. In the drawing of the rib 35, it is cold worked to impart substantial hardness and resiliency to the material thereof.

Thereafter, the laterally extending flange 27 is worked into axial direction as an extension of the radially outer side of the rib 35 and the retaining fingers trimmed in the flange are also cold worked into their axially extending position, and the finger terminals 29 bent into position.

According to the present invention the reenforcing and stop corrugations 31 are worked into the flange 27 by reworking the corrugations into the flange during the flange straightening step. This is accomplished by drawing die structure as shown in Figures 4 and 5. This includes a stationary or supporting die assembly 37 and a reciprocable or working die assembly 38. The partially drawn cover blank is placed upon the die assembly 37 and the upper working die assembly 38 then operates to work the flange 27 as described.

Herein the stationary die assembly 37 includes a bed plate or block 39 upon which is mounted an annular spacer ring member 40 upon which is carried concentric supporting die members 41 and 42. The annular supporting die member 41 is contoured conformable or complementary to the shape of the radially outer section of the outer cover portion 22 and has an upstanding annular nose rib or ridge 43 which fits snugly within the hollow rib of the cover blank. At its lower outer circumference, the supporting die member 41 fits within the inner circumference of the annular member 42 which faces upwardly and has at juncture with the supporting die member 41 a chamfer 44 at an oblique angle and conformable to the angle desired for the retaining finger terminal flanges 29.

The upper working die assembly 38 includes a head plate or block 45 which is reciprocably supported by a press ram (not shown). Carried by the head plate 45 is a relatively reciprocable hold down die ring 47 arranged to be initially projected below the head plate 45 by means of actuating rods or plungers 48. The hold down ring 47 has its lower surface conformed in contour to the upper surface of the cover portion 22 and the rib 35 and cooperates with the supporting die ring 41 and the supporting ridge 43 to hold the cover portion 22 and the upstanding rib 35 against displacement during working of the flange 27.

Carried by the head plate 45 and reciprocable relative to the hold down ring 47 is a flange working die ring 49 which encircles the hold down ring 47 slidably at the outer periphery of the latter, and has at its lower inside corner a depending flange working rib 50. As the working die ring 49 is driven downwardly in a working stroke, it wipes the laterally projecting flange 27 axially downwardly progressively alongside the radially outer periphery of the hold down ring 41 until the terminals of the finger extensions are bent into angular retaining terminal form within the oblique-walled groove provided by the chamfer 44.

As the working die ring 49 works the flange 27 down, it also cooperates with means on the supporting die ring 41 to corrugate the flange 27 in line with the arcuate cutouts 30 between the retaining fingers. To this end, the inner lower corner of the working die member 49 is cutout or recessed at suitable intervals to provide shaping cavities 51 transversely and longitudinally contoured and conformable to the preferred shape for the flaring corrugations 31, with contour recess portions 52 in the cavities to shape the turned reenforcing and pry-off lips 34.

Cooperable with the die cavities 51 are complementary radially outward abutments or male die projections 53 on the supporting die ring 41. For rigidity these male die projections extend to the base of the die ring 41 so as to rest solidly on the supporting ring 40, and the outer annular ring member 42 is provided with suitable vertical clearance recesses 54 in its inner perimeter to accommodate the projections 53. At their upper ends the projections 53 are provided with a contour, as shown complementary to the respective shaping cavities 51 and lip forming counter-cavities 52. As a result, as the forming die ring 49 works the flange 27 down, the projections 53 cooperate with the cavities 51 to work the corrugations 31 into the flange 27 between the finger extensions 28. This relationship is shown in Fig. 5. Since this cold working and hardening of the flange 27 and the cold working and stretching and hardening of the corrugations 31 therein is all accomplished uniformly throughout the circumference of the flange 27, uniform reenforcement and strong resilient resistance to radial deflection of the worked down flange 27 is attained.

After working of the flange 27 has been accomplished, as described, the partially finished cover is completed by bending the rib 35 laterally and radially outwardly through and beyond the circle of the flange 27 into position angular to the dished surface 21 of the cover whereby to increase the overall diameter of the cover and conceal the flange 27 therebehind. The steps by which this may be accomplished are shown in Figures 7 and 8.

After removal of the cover blank from the die assembly 38, the upstanding rib 35 may be folded laterally outwardly by stages as shown. As a first step in the collapsing and outwardly folding of the rib 35, it may be partially collapsed and bent out as shown in dash outline in Fig. 7 and in full outline in Fig. 8. Finally, the partially collapsed fold rib 35 is entirely collapsed upon itself with the radially inner wall thereof providing the annular reenforcing marginal rib portion 23 of the cover and the radially outer leg of the rib providing the underturned flange 24.

In the collapsing end bending over of the annular rib 35, the axially outer ends of the reenforcing corrugations 31 will serve to afford a convenient annular fulcrum about which the bending of the outer leg of the rib proceeds, and toward which the the inner leg of the rib is bent and then indented at the base end thereof to afford the annular reenforcing rib 32 contiguous the axially outer ends of the corrugations.

It will be appreciated that in the cold working to which the rib 35 is subjected not only in its initial formation but subsequently as it is bent radially outwardly and collapsed, and the cold working to which the axial flange 27 is subjected when it is straightened and as it is provided with the corrugations 31, as well as the working to which the finger extensions 28 and the terminals 29 are subjected, all adds up to an efficiently hard, stiffly resilient cover marginal extremity and retaining flange and finger structure mutually coacting to effect the positive retaining grip of the retaining terminals 29 upon the rim flange when the cover is on the wheel.

It will be understood that modifications and variations may be effected without departing from the scope of the concepts of the present invention.

I claim as my invention:

In a die assembly for working a lateral flange on a partially formed cover blank into an axially extending flange and retaining fingers, a supporting die structure for supporting the cover and having an outer peripheral surface, a working die structure cooperable with said outer peripheral surface to work the lateral flange of the cover down into an axially extending flange and circumferentially spaced retaining finger extensions, said working die structure having corrugated recesses opening radially inwardly and downwardly and located to engage the downwardly worked cover flange intermediately relative to said finger extensions, and the supporting die structure having radially outward projections therefrom cooperating with said recesses to corrugate the flange as it is worked down alongside said supporting die structure, said die structures having means, intermediate the corrugating recesses and projections, for shaping the finger extensions axially and including respective axially extending ribs and complementary grooves located intermediate said recesses and projections but circumferentially aligned to bend retaining terminals on the finger extensions.

References Cited in the file of this patent

UNITED STATES PATENTS

| 1,884,700 | Hotherswell | Oct. 25, 1932 |
| 2,239,897 | Lyon | Apr. 29, 1941 |
| 2,254,376 | Lyon | Sept. 2, 1941 |
| 2,304,582 | Lyon | Dec. 8, 1942 |
| 2,475,830 | Fink | July 12, 1949 |

FOREIGN PATENTS

| 469,279 | Canada | Nov. 14, 1950 |
| 471,604 | Canada | Feb. 20, 1951 |